United States Patent [19]

Batzer et al.

[11] 4,400,296
[45] Aug. 23, 1983

[54] CATION-SELECTIVE LIQUID MEMBRANES AND THEIR USE

[75] Inventors: Hans Batzer, Arlesheim, Switzerland; Joel Sinnreich, Bensheim, Fed. Rep. of Germany

[73] Assignee: Ciba-Geigy Corporation, Ardsley, N.Y.

[21] Appl. No.: 274,962

[22] Filed: Jun. 18, 1981

[30] Foreign Application Priority Data

Jun. 23, 1980 [CH] Switzerland ............... 4807/80

[51] Int. Cl.³ ............................................. B01F 1/00
[52] U.S. Cl. .............................. 252/364; 204/DIG. 13; 210/643; 423/8; 423/DIG. 14
[58] Field of Search ................. 252/364, DIG. 11; 210/643; 560/127; 423/DIG. 14

[56] References Cited

U.S. PATENT DOCUMENTS

| | | | |
|---|---|---|---|
| 3,592,775 | 7/1971 | Swanson | 252/182 |
| 3,939,203 | 2/1976 | Mattison et al. | 260/566 A |
| 4,249,000 | 2/1981 | Batzer et al. | 536/66 |

FOREIGN PATENT DOCUMENTS

| | | | |
|---|---|---|---|
| 44-27577 | 11/1969 | Japan | 560/127 |
| 2016471 | 9/1979 | United Kingdom | 536/66 |

OTHER PUBLICATIONS

R. W. Baker et al., J. Membrane Science, 2, 213 (1977).
J. Sinnreich et al., Helv. Chim. Acta, 62, 1682 (1979).
R. H. Guy et al., J. Chem. Soc., Chem. Comm., 17, 729 (1979).

*Primary Examiner*—Richard D. Lovering
*Attorney, Agent, or Firm*—Luther A. R. Hall

[57] ABSTRACT

Use of succinosuccinic acid diesters of the formula

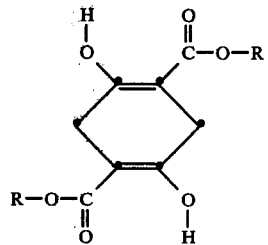

in which R is an alkyl, alkenyl or cycloalkyl having 4 to 24 C atoms, either dissolved in a water-immiscible organic solvent, or at elevated temperature in the form of their melts, as cation-selective liquid membranes.

3 Claims, No Drawings

CATION-SELECTIVE LIQUID MEMBRANES AND THEIR USE

The present invention relates to cation-selective liquid membranes consisting of succinosuccinic acid diesters dissolved in organic solvents or of their solvent-free melts, and to their use for the separation of polyvalent cations from monovalent cations or for the selective separation of different polyvalent cations from aqueous solutions.

It is known that the metal cations can be dissolved out of aqueous solutions containing metal salts, by bringing these solutions into contact with organic solvents which contain a dissolved complexing agent. Such organic solutions containing at least one complexing agent, for example phenolic oximes, and their use for obtaining metal cations from aqueous solutions, are described, for example, in U.S. Pat. Nos. 3,592,775 and 3,939,203. In these patent specifications, the two solutions are brought into contact by shaking in a separating funnel or by stirring the organic solution with the aqueous solution.

"Journal of Membrane Science", 2 (1977), pages 213–233, has furthermore disclosed the use of organic solutions which contain a complexing agent or a so-called "carrier agent", as liquid membranes for coupled ion transport. The method of operation of cation-selective liquid membranes which are used between two aqueous solutions of different pH values is described in the said "Journal of Membrane Science" on pages 214–216, using coupled $Cu^{2+}/H^+$ transport as an example. According to this description, at the interface between the liquid membrane and the $Cu^{2+}$ salt solution of higher pH value, the copper ion reacts with the "carrier agent", a complex being formed. The Cu complex, which is soluble only in the organic phase of the liquid membrane, is transported through the liquid membrane into the aqueous solution of lower pH value, and, at this liquid membrane/aqueous solution interface, the complexed Cu cation is released into the aqueous solution and the "carrier agent" diffuses back through the liquid membrane to the other interface, taking up 2 protons and, at the latter interface, complexes Cu cations again.

The reactions taking place at the two interfaces of the liquid membrane can be represented by the following equation $$2HR + Cu^{2+} \rightleftharpoons CuR_2 + 2H^+$$

in which HR is a "carrier agent". Furthermore, such liquid membranes make it possible to concentrate certain cations against their own concentration gradient in an aqueous solution of lower pH value.

The liquid membranes described in the said "Journal of Membrane Science" operate at relatively low pH values and are cation-selective with respect to $Cu^{2+}$ or $Fe^{3+}$ cations.

It has now been found that certain succinosuccinic acid diesters are valuable "carrier agents" for liquid membranes, which permit their use with aqueous solutions of comparatively high pH values, i.e. under milder conditions. The liquid membranes according to the invention permit a complete separation of polyvalent cations from monovalent cations and also a selective separation of different polyvalent cations.

The present invention thus relates to liquid membranes for the separation of polyvalent cations from monovalent cations, from aqueous solutions, or for the selective separation of different polyvalent cations from aqueous solutions, which consist of an essentially water-immiscible organic solvent and of an essentially water-insoluble succinosuccinic acid diester, dissolved in the said solvent, of the formula I

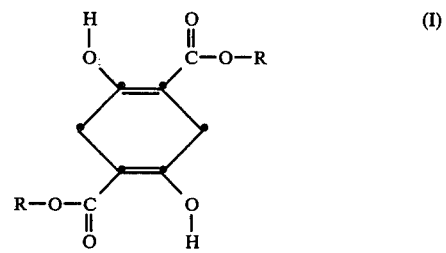

in which R is an alkyl, alkenyl or cycloalkyl having up to 24 C atoms, in particular having 4 to 24 C atoms, the proportion of the succinosuccinic acid diester in the organic solvent being at least 0.01% by weight, based on the organic solvent, or of the melt of compounds of the formula I.

The liquid membranes preferably consist of a succinosuccinic acid diester of the formula I in which R is an alkyl or alkenyl having 4 to 18 C atoms, and of a water-immiscible organic solvent.

In particular, the liquid membranes according to the invention consist of an aprotic non-polar solvent and dioleyl succinosuccinate.

The succinosuccinic acid diesters of the formula I are known and can be prepared, for example, by the process described in "Helvetica Chimica Acta", Volume 62, 1979, pages 1,682–1,687, by the transesterification of diethyl succinosuccinate with the corresponding Na alcoholates.

British Pat. No. 2,016,471 has furthermore disclosed the use of polymers modified by succinosuccinic acid esters for the preparation of membranes for use in processes for the separation of material, and that the modified polymers have groups which form metal chelates. By means of chelation with certain heavy metal salts, the biological degradability of these membranes can be effectively inhibited. On the other hand, the high hydrophobicity of the metal-chelated succinosuccinic acid diesters of the formula I, and the suitability of the compounds of the formula I as "carrier agents" in liquid membranes, cannot be inferred from British Patent Specification No. 2,016,471.

Because succinosuccinic acid diesters are readily soluble in organic solvents, any water-immiscible organic solvents can be used for the liquid membranes according to the invention. It is preferred to use aprotic non-polar solvents, for example benzene, toluene and other hydrocarbons, such as n-pentane or n-hexane, and also chlorinated aliphatic or aromatic hydrocarbons, for example methylene chloride, chloroform, ethylene chloride or chlorobenzene.

The liquid membranes according to the invention can be used even with small amounts of dissolved succinosuccinic acid diesters. The proportion of the succinosuccinic acid diester dissolved in the organic solvent must be at least 0.01% by weight, based on the organic solvent, and can vary up to 100% by weight. It is also possible to use solvent-free liquid membranes by using the melt of the succinosuccinic acid diesters of the formula I and carrying out the separation process at elevated temperature, preferably just above the melting point of the succinosuccinic acid diester employed. Bis-(2-ethylhexyl) succinosuccinate (melting point: 30°–33° C.) or dioleyl succinosuccinate (melting point: 62° C.), and also mixtures of these diesters with other succinosuccinic acid diesters of the formula I, are especially suitable for this purpose. If the separation process is carried out at elevated temperature, an acceleration of the flow of cations through the liquid membrane is generally also achieved. The liquid membranes according to the invention can be employed in the conventional manner for the cation-selective separation process, the apparatus used for carrying out the separation process depending essentially on the density of the liquid membrane. If, for example, the liquid membrane has a greater density than the aqueous solution, the separation process is advantageously carried out in a U-tube, the liquid membrane filling the lower part of the U-tube in such a way that the aqueous solutions present in the two arms of the U-tube are completely separated from one another. If the liquid membrane contains a high-boiling solvent, the separation process can also advantageously be carried out at elevated temperature. If the density of the liquid membrane is less than that of water, an inverted or double-bent U-tube is suitable for carrying out the separation process.

The liquid membranes according to the invention can also be used in the form of supported membranes. To achieve a better membrane stability, the organic solutions of the succinosuccinic acid diesters of the formula I are absorbed by, for example, a porous plastic matrix or ceramic matrix. Intercellular membranes, such as porous foam plastic sheets or glass filters with capillary interstices, or also cell filter membranes, such as those described, for example, in "Journal of the Chemical Society, Chemical Communications", No. 17/1979 (September), on pages 729 to 730, are especially suitable for this purpose.

As mentioned at the outset, the liquid membranes according to the invention are outstandingly suitable for the separation of polyvalent cations from monovalent cations and also for the selective separation of different polyvalent cations from aqueous solutions, according to the principle of coupled ion transport. In this process, the liquid membrane is used as a barrier between two aqueous solutions, so that these solutions are completely separated from one another.

The present invention thus also relates to a process for the separation of polyvalent cations from monovalent cations or for the selective separation of different polyvalent cations from aqueous solutions, according to the principle of coupled ion transport and using a liquid membrane, which comprises using the liquid membrane according to the invention between two aqueous solutions having different pH values, the aqueous solution into which the polyvalent cations are transported through the liquid membrane having a pH value of 1 to 8, and this pH value necessarily being lower than the pH value of the other aqueous solution, which contains the cations to be separated selectively.

The aqueous solution into which the polyvalent cations are transported through the liquid membrane preferably has a pH value of 1 to 5, and this value is at least one whole unit lower than the pH value of the other aqueous solution, which contains the cations to be separated selectively.

The pH value of the aqueous solution which contains the cations to be separated can be either in the acid range or in the weakly alkaline range and must be higher than the pH value of the other aqueous solution, into which the cations are transported. The pH value of the latter solution can be adjusted either with inorganic acids or with organic acids. Hydrochloric or sulphuric acid is advantageously used.

For the selective separation of different or identical polyvalent cations, it is suitable to use several liquid membranes in series. The number of such membranes in series depends on the number of cations to be separated or on the flow rate of these cations in the liquid membrane.

The process according to the invention is suitable, for example, for the purification of effluents from electroplating processes or for the recovery of metals from these effluents, for the concentration of metal cations from solutions of low concentration, for the extraction of valuable metals from sea water or ash, especially industrial ash, or for isotope separation.

The following examples illustrate the invention in greater detail:

EXAMPLE 1

30 ml of a 0.5 molar solution of dioleyl succinosuccinate in chloroform were filled into a U-tube. 20 ml of a 0.25 molar aqueous Cu acetate solution were then introduced into one arm of the U-tube and 20 ml of a 10% aqueous hydrochloric acid solution were introduced into the other arm. The two aqueous solutions were separated from one another by the chloroform phase present at the bottom of the U-tube. The initial pH value of the Cu acetate solution was 4.9 and that of the hydrochloric acid solution was ~1.

After 138 days, the concentration of $Cu^{2+}$ ions in the hydrochloric acid solution was $15.5 \times 10^{-2}$ mols/liter. No $Cl^-$ ions could be determined in the Cu acetate solution, which indicates that $Cu^{2+}/H^+$ exchange has really taken place.

The concentrations of $Cu^{2+}$ ions determined, during the flow of $Cu^{2+}$ ions, in the hydrochloric acid solution initially free of $Cu^{2+}$ ions are given in Table 1.

TABLE 1

| Days | Concentration of $Cu^{2+}$ ions after ion transport through the liquid membrane | | | | | | | | | | | | | |
|---|---|---|---|---|---|---|---|---|---|---|---|---|---|---|
| | 1.75 | 4.6 | 6 | 11 | 14 | 20.8 | 25 | 29 | 33 | 39 | 54 | 78 | 98 | 138 |
| $10^{-2}$ mol/liter of $Cu^{2+}$ | 0.025 | 0.44 | 1.1 | 1.4 | 1.73 | 2.4 | 2.83 | 3.05 | 3.05 | 3.4 | 5.1 | 6.53 | 11.5 | 15.5 |

In a blind experiment, the above example was repeated, but the chloroform phase contained no dioleyl succinosuccinate. After 116 days, the concentration of $Cu^{2+}$ ions in the hydrochloric acid solution was only $7.6 \times 10^{-4}$ mols/liter. The concentrations of $Cu^{2+}$ ions determined in the hydrochloric acid solution are summarised in Table 2.

TABLE 2

| | Concentration of $Cu^{2+}$ ions in the hydrochloric acid solution | | | | | | | |
|---|---|---|---|---|---|---|---|---|
| Days | 8 | 12 | 18 | 33 | 53 | 63 | 76 | 116 |
| $10^{-5}$ mol/liter of $Cu^{2+}$ | 2.3 | 2.3 | 2.3 | 9.9 | 17.9 | 25.0 | 36.0 | 76.0 |

EXAMPLE 2

A U-tube was separated into two compartments with 30 ml of a 0.5 M solution of dioleyl succinosuccinate in chloroform. 30 ml of a 0.5 M aqueous Cu acetate solution were introduced into each of the two arms. The pH value of one of the Cu salt solutions was 5.5 (solution b) and the Cu salt solution in the other arm of the U-tube was acidified with hydrochloric acid to pH 2 (solution a). $Cu^{2+}$ ions flowed into the chloroform phase and from there into the hydrochloric acid solution of lower pH value. After 116 days, the concentration of $Cu^{2+}$ ions was $1.9 \times 10^{-2}$ mols/liter in solution b and $7.8 \times 10^{-2}$ mols/liter in solution a. The concentrations determined in solution a and solution b are reproduced in Table 3.

TABLE 3

| | | $Cu^{2+}$ ion concentrations in solution a and solution b | | | | | | | | |
|---|---|---|---|---|---|---|---|---|---|---|
| Days | | 4 | 8 | 12 | 14.75 | 18 | 33 | 53 | 63 | 76 | 116 |
| $10^{-2}$ mol/liter of $Cu^{2+}$ | solution a | 4.9 | 4.9 | 4.9 | 4.9 | 4.4 | 4.4 | 5.4 | 5.3 | 6.2 | 7.8 |
| | solution b | 5.0 | 4.8 | 4.8 | 4.6 | 4.4 | 4.4 | 4.0 | 3.5 | 3.2 | 1.9 |

EXAMPLE 3

An aqueous solution containing a mixture of Cu acetate (concentration: $8.66 \times 10^{-2}$ mols/liter), Ca acetate (concentration: $4.24 \times 10^{-2}$ mols/liter) and K acetate (concentration: $16.9 \times 10^{-2}$ mols/liter) was introduced into one side of a U-tube which contained the chloroform solution described in Example 1 as the liquid membrane. The initial pH value of this acetate solution was 5.75. The other side of the U-tube was filled with an aqueous hydrochloric acid solution of pH value ~1. After 76 days, the concentration of $Cu^{2+}$ ions was $8.0 \times 10^{-3}$ mols/liter and that of the $Ca^{2+}$ ions was $3.74 \times 10^{-5}$ mols/liter, in the hydrochloric acid solution. Although the concentration of $K^+$ ions in the acetate solution was the highest, no $K^+$ ions could be determined in the hydrochloric acid solution after 76 days. The ion concentrations determined in the hydrochloric acid solution are given in Table 4.

TABLE 4

| | Ion concentrations after transport through the liquid membrane | | | | | | | |
|---|---|---|---|---|---|---|---|---|
| Days | 3 | 7 | 11 | 17 | 32 | 52 | 63 | 76 | 116 |
| $10^{-3}$ mol/liter of $Cu^{2+}$ | 0.17 | 0.35 | 0.35 | 0.48 | 1.5 | 3.9 | 5.2 | 8.0 | 10.5 |
| $10^{-5}$ mol/liter of $Ca^{2+}$ | 1.75 | 1.5 | 1.5 | 2.2 | 3.1 | 4.0 | 4.9 | —* | — |

*means that the concentration was not determined.

EXAMPLE 4

3 U-tubes were filled with the chloroform solution according to Example 1 as the liquid membrane. One arm of each of the three U-tubes was filled with aqueous hydrochloric acid solution of pH value ~1, and a Co acetate solution (concentration: 0.25 mol/liter; pH value: 6.9), a Ni acetate solution (concentration: 0.25 mol/liter; pH value: 6.9) or a Ca acetate solution (concentration: 0.25 mol/liter; pH value: 8.2) was introduced into the other arms of the U-tubes.

After 20.8 days, the concentration of $Co^{2+}$ ions was $8.15 \times 10^{-4}$ mols/liter, that of the $Ni^{2+}$ ions was $6.5 \times 10^{-4}$ mols/liter and that of the $Ca^{2+}$ ions was $5.0 \times 10^{-4}$ mols/liter, in the hydrochloric acid solution. $Cl^-$ ions could not be determined in any of the three acetate solutions.

The ion concentrations determined in the respective hydrochloric acid solution are given in Table 5.

TABLE 5

| | | Ion concentrations after transport through the liquid membranes | | | | | |
|---|---|---|---|---|---|---|---|
| Days | | 1 | 1.75 | 4.6 | 6 | 11 | 14 | 20.8 |
| $10^{-4}$ mol/liter of | $Co^{2+}$ | — | 0.17 | 0.34 | 1.19 | 2.02 | 5.43 | 8.14 |
| | $Ni^{2+}$ | — | — | — | — | 6.80 | 22.28 | 64.96 |
| | $Ca^{2+}$ | 0.025 | — | 0.175 | 0.599 | 0.848 | 3.144 | 5.015 |

EXAMPLE 5

A porous hydrophobic sheet consisting of polypropylene was impregnated at 60° C. with dioleyl succinosuccinate by laying the sheet, at this temperature, in a chloroform solution containing the succinosuccinic acid ester. After draining, the impregnated sheet was then set up as a dividing wall between two cells, one of the cells containing aqueous hydrochloric acid solution of pH value ~1 and the other cell containing an aqueous Cu acetate solution with a concentration of $4.3 \cdot 10^{-2}$ mols/liter and of pH value ~5. The experimental vessel containing the two cells was kept at 80° C. and the development of the $Cu^{2+}$ ion concentration in the hydrochloric acid solution was followed continuously. After 36.1 days, the $Cu^{2+}$ ion concentration in the aqueous hydrochloric acid solution was $5.81 \times 10^{-5}$ mols/liter. The measured ion concentrations are given in Table 6 below.

TABLE 6

| | $Cu^{2+}$ concentration after ion transport through the impregnated sheet | | | | | | | | | | | |
|---|---|---|---|---|---|---|---|---|---|---|---|---|
| Days | 0.8 | 1.8 | 5.8 | 6.8 | 8.8 | 9.8 | 12.8 | 15.8 | 19.8 | 22.8 | 27.1 | 36.1 |
| $10^{-6}$ mol/liter of $Cu^{2+}$ | 1.9 | 1.9 | 5.8 | 8.0 | 11.3 | 16.5 | 25.2 | 24.3 | 29.9 | 37.6 | 37.4 | 58.1 |

EXAMPLE 6

30 ml of a uranyl acetate solution (concentration: 0.16 mol/liter, pH value: ~4) were introduced into one side of a U-tube which had been filled, in the lower part, with a 0.5 M solution of dioleyl succinosuccinate in chloroform. Aqueous hydrochloric acid solution (pH value: ~1) was introduced into the other side of the U-tube. The concentration of $UO_2^{2+}$ ions in the originally uranyl-free hydrochloric acid solution was $3 \times 10^{-5}$ mols/liter after 7 days and $6.52 \times 10^{-5}$ mols/liter after 14 days.

EXAMPLE 7

An aqueous acetate solution containing uranyl acetate in a concentration of $8.8 \cdot 10^{-2}$ mols/liter and Cu acetate in a concentration of $9.8 \cdot 10^{-2}$ mols/liter, which had a pH value of ~5, was filled into one side of a U-tube, into the lower part of which the chloroform solution used in Example 6 had been introduced. An aqueous hydrochloric acid solution, which had a pH value of 1, was introduced into the other side of the U-tube.

After 7 and 14 days, the content of $UO_2^{2+}$ ions in the hydrochloric acid solution was $2.43 \cdot 10^{-5}$ mols/liter and $6.08 \cdot 10^{-5}$ mols/liter, respectively, and the content of $Cu^{2+}$ ions was $25.2 \cdot 10^{-5}$ mols/liter and $51.5 \cdot 10^{-5}$ mols/liter, respectively.

EXAMPLE 8

30 ml of a 0.5 molar solution of diethyl succinosuccinate in chloroform were filled into a U-tube. 25 ml of an aqueous acetate salt solution (solution a), containing $9.6 \times 10^{-2}$ mols/liter of $Cu^{2+}$, $8.5 \times 10^{-2}$ mols/liter of $Ni^{2+}$, $8.6 \times 10^{-2}$ mols/liter of $Cd^{2+}$, $8 \times 10^{-2}$ mols/liter of $Ca^{2+}$ and $13 \times 10^{-2}$ mols/liter of $K^+$, were then introduced into one arm of the U-tube and 25 ml of a 10% aqueous hydrochloric acid solution (solution b) were introduced into the other arm of the U-tube. The two aqueous solutions were separated from one another by the chloroform phase.

After 150 days, the concentration of copper ions in the hydrochloric acid solution was $6.9 \times 10^{-2}$ mols/liter, whilst the concentration of all other cations was lower than $10^{-4}$ mol/liter. The depletion of the copper ions in solution a and their concentration in solution b are summarised in the following table.

| Days | | 0 | 14 | 56 | 100 | 150 |
|---|---|---|---|---|---|---|
| $c(Cu^{2+})$, mols/liter | Solution a | $9.6 \times 10^{-2}$ | $3.5 \times 10^{-2}$ | $4.8 \times 10^{-3}$ | $1.5 \times 10^{-3}$ | $4.6 \times 10^{-4}$ |
| | Solution b | $< 2.10^{-4}$ | $2.7 \times 10^{-2}$ | $4.3 \times 10^{-2}$ | $6.0 \times 10^{-2}$ | $6.9 \times 10^{-2}$ |

What is claimed is:

1. A liquid membrane for the separation of polyvalent cations from monovalent cations, from aqueous solutions, or for the selective separation of different polyvalent cations from aqueous solutions, which consists of an essentially water-immiscible organic solvent and of an essentially water-insoluble succinosuccinic acid diester, dissolved in the said solvent, of the formula I

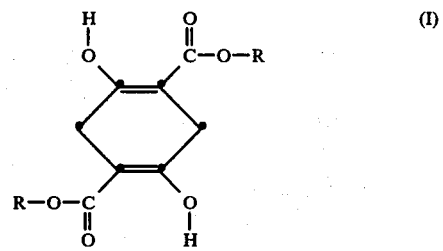

in which R is alkyl having 8 to 24 C atoms or alkenyl having 8 to 24 C atoms, the proportion of the succinosuccinic acid diester in the organic solvent being at least 0.01% by weight, based on the organic solvent, or of the melt of a compound of the formula I.

2. A liquid membrane according to claim 1, which consists of a succinosuccinic acid diester of the formula I in which R is alkyl or alkenyl having 8 to 18 C atoms, and of a water-immiscible organic solvent.

3. A liquid membrane according to claim 1, which consists of an aprotic non-polar solvent and dioleyl succinosuccinate.

* * * * *